Sept. 16, 1958

R. ADLER ET AL 2,852,599

COLOR TELEVISION

Filed July 18, 1956

3 Sheets-Sheet 1

ROBERT ADLER
JOHN G. SPRACKLEN
*INVENTORS.*

BY John J. Pederson

THEIR ATTORNEY.

Sept. 16, 1958 R. ADLER ET AL 2,852,599

COLOR TELEVISION

Filed July 18, 1956 3 Sheets-Sheet 2

ROBERT ADLER
JOHN G. SPRACKLEN
*INVENTORS.*

BY John J. Pederson

THEIR ATTORNEY.

ROBERT ADLER
JOHN G. SPRACKLEN
*INVENTORS.*

*BY* John J. Pederson
THEIR ATTORNEY.

United States Patent Office 2,852,599

Patented Sept. 16, 1958

2,852,599

COLOR TELEVISION

Robert Adler, Northfield, and John G. Spracklen, Chicago, Ill., assignors to Zenith Radio Corporation, a corporation of Delaware Application July 18, 1956, Serial No. 598,667

10 Claims. (Cl. 178—5.4)

This invention relates generally to color television receivers and more particularly to new and improved frequency-control systems for use in such receivers.

In a color television system, it is necessary that three different types of information be broadcast by the transmitter and interpreted by the receiver. The color coordinates employed in the National Television Systems Committee color television system, commonly known as NTSC system, are luminance, dominant wavelength, and spectral purity, these being colorimetric quantities which serve as measures of the subjective sensations of brightness, hue, and saturation, respectively.

The luminance information is conveyed in the NTSC system by a monochrome signal which is amplitude-modulated onto the picture-carrier in exactly the same manner as is the ordinary video signal in monochrome television. The remaining two degrees of coloring information are transmitted by a chrominance signal, consisting of a constant-frequency subcarrier signal whose relative phase is determined by the dominant wavelength and whose amplitude is determined by the spectral purity of the color being transmitted. Therefore the color-carrier signal conveys one component of the color information (the hue) as phase modulation, and another component (the saturation) as amplitude modulation.

In a color television receiver, the chrominance signal is separated from the monochrome signal and translated into color-difference signals, which can be used in conjunction with the monochrome signal to control the color output of a tricolor picture tube. This translation of the chrominance signal into color-difference signals is performed by what are called "synchronous demodulators." These are basically similar to the mixer stages in superheterodyne radio receivers, the principal difference lying in the use of a locally-generated subcarrier of the same frequency as that of the incoming subcarrier. In addition, however, the synchronous demodulator in an NTSC color television receiver must detect both the amplitude and the phase of the subcarrier rather than just its amplitude alone. With this type of detection, both hue and saturation information can be deduced from the modulated subcarrier.

Detection of the amplitude and the phase of the color subcarrier would not be possible if exact phase synchronism were not maintained between the subcarrier oscillators at the transmitter and the receiver. In order to maintain these two oscillators in phase, it is customary to provide a color reference in the transmitted signal by transmitting a short burst of oscillations at subcarrier frequency during line retrace intervals at the beginning of each horizontal scanning line. This burst is frequent enough, and of sufficient duration, to permit the receiver oscillator to be maintained in exact phase relationship with the equivalent transmitter oscillator.

The burst consists of approximately 8 cycles of a 3.58 megacycle signal, the subcarrier frequency, and is placed on the "back porch" of the horizontal blanking pedestal following the horizontal sync pulse. The color burst does not interfere with horizontal synchronization because it is lower in amplitude than the sync pulse, and only the amplitude of the leading edge of the sync pulse is important in maintaining horizontal synchronization. Therefore, the color synchronization circuits in receivers have the purpose of deriving or generating color-reference signals of the correct frequency and having a definite phase relation to the transmitted color-burst.

Known color synchronization or automatic-phase-control circuits generate the reference signal in a local oscillator and compare it with the burst in a phase detector; the output of the phase detector is applied to a reactance tube which modifies the oscillator frequency so as to maintain the desired phase relation. This has heretofore necessitated the use of three essentially separate vacuum tube stages, along with the appropriate circuitry, to perform the necessary combined functions of a phase detector, local oscillator, and reactance tube.

It is a primary object of the present invention to provide a new and improved chrominance subcarrier synchronization system for color-television receivers.

It is another object of the present invention to provide a novel and improved color-synchronization system for color-television receivers for performing the several functions of color-burst phase detector, color-reference oscillator, and reactance tube.

It is a further object of the invention to provide a new and improved beam deflection tube which is particularly suited for performing the functions of phase detector, local oscillator and reactance tube for color-synchronization in color-television receivers or the like.

Still another important object of the present invention is to provide new and improved electrical apparatus for developing, in response to intermittent incoming oscillatory signal bursts, a continuous output signal of corresponding frequency and bearing a substantially fixed phase relation with respect to the incoming control signal bursts.

It is a further object of the invention to provide such a system having greatly improved noise immunity.

Still another object of the present invention is to achieve these desired objectives while at the same time effecting a substantial cost reduction in the apparatus required to perform these functions.

In accordance with the present invention, a new and improved color-signal synchronization system for color-television receivers comprises an electron-discharge system including a cathode for projecting an electron beam along a reference axis, means for controlling the intensity of the electron beam, a pair of output electrodes having electron-receptive areas on opposite sides of the reference axis, and deflection-control means for controlling the distribution between the output electrodes of space current from the electron beam. Oscillator means are provided including at least a portion of the electron-discharge system and a frequency-determining circuit coupled to at least one of the output electrodes for generating a color-reference signal of nominal frequency substantially equal to that of the color-synchronizing-burst reference signal as transmitted in the composite color signal. A phase detector is coupled to the oscillator means and is responsive to application of the color-synchronizing-burst signal for developing a unidirectional control voltage indicative of the instantaneous phase relation between the color-synchronizing-burst signal and the color-reference signal. Circuit means are provided for applying the unidirectional control voltage to the deflection-control means to vary the space-current distribution between the output electrodes in accordance with departures from a predetermined nominal phase relation. Means coupled to the output electrodes and to the frequency-determining circuit and responsive to variations in space-current distribution between the output electrodes are provided for effectively varying the frequency of the frequency-determining circuit in a direction tending to restore the predetermined phase relation. Finally, color demodulator means are coupled to the oscillator means for utilizing the color-reference signal to detect the two degrees of coloring information transmitted by a chrominance signal.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Throughout the specification and the appended claims, the color television terms employed and their definitions thus intended are as set forth by the Institute of Radio Engineers, 55 IRE 22.51 "Standards on Television: Definitions of Color Terms, 1955" appearing in the June 1955 issue of the "Proceedings of the IRE."

Figures 1, 2:
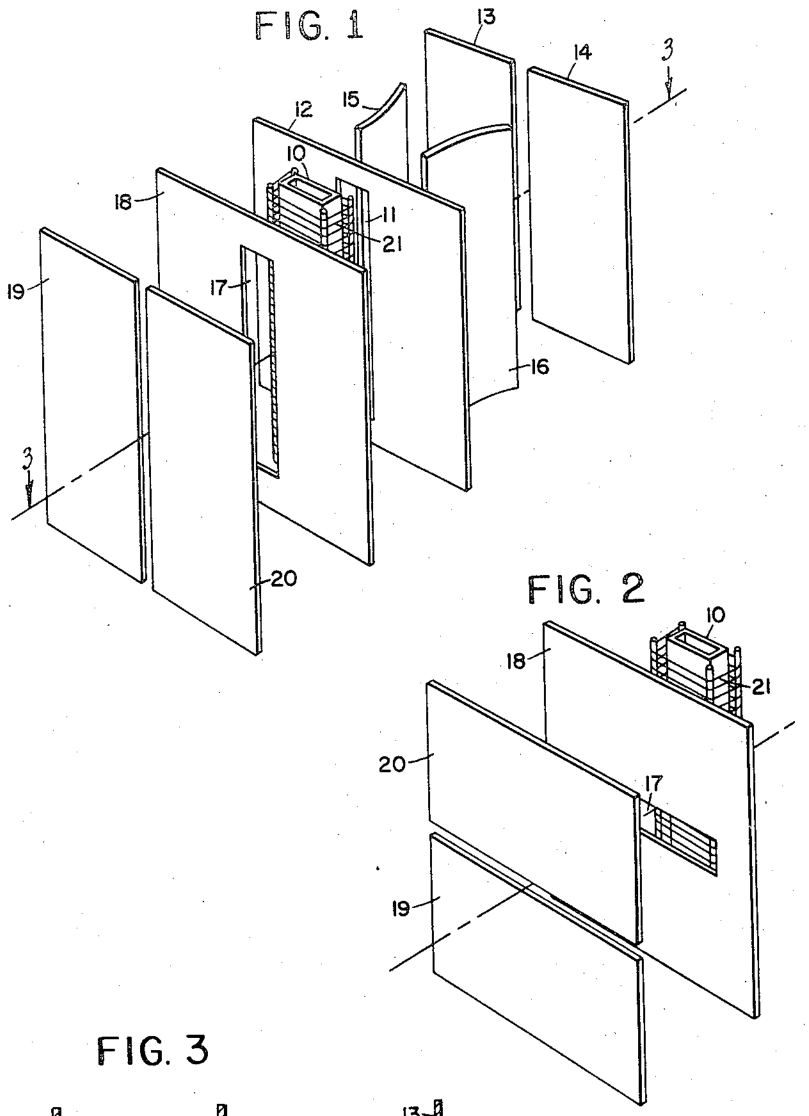
Figure 1 is a perspective view of the electrode system of a new and improved electron-discharge device constructed in accordance with the present invention.
Figure 2 is a perspective view of the electrode system exemplifying another construction in accordance with the present invention.

In the perspective view of Figure 1, which illustrates the essential elements of an electron-discharge device of preferred construction in accordance with the invention, two separate and oppositely directed sheet-like electron beams of substantially rectangular cross-section are projected from oppositely disposed electron-emissive surfaces of a common elongated cathode 10 which is provided with an indirect heater element (not shown). In the right-hand section of the tube, as viewed in Figure 1, space electrons originating at the cathode 10 are projected through slot 11 of an accelerating electrode 12 toward two plate electrodes 13 and 14, respectively having their active areas on opposite sides of the undeflected axis of the electron beam. Anodes 13 and 14 are preferably symmetrical with respect to the undeflected axis of the electron beam, although other balanced anode systems having equal projected receptive areas, in a plane perpendicular to the undeflected axis of the electron beam and on opposite sides of the axis may be employed. A deflection-control system, illustrated as a pair of electrostatic-deflection plates 15 and 16, is provided between the accelerating electrode 12 and anodes 13 and 14.

In the left-hand section of the tube, as viewed in Figure 1, electrons originating from the opposite emissive surface of cathode 10 are projected through a slot 17 of an accelerating electrode 18 toward a balanced anode system comprising a pair of anodes 19 and 20. These anodes are so arranged that they receive substantially equal currents when they are operated at a common potential; the line of separation between them may be parallel to cathode 10 as illustrated in Figure 1. An alternative construction of the left-hand section of the tube, in which the line of separation is perpendicular to cathode 10, is illustrated in Figure 2. A common control grid 21 is provided and encompasses the cathode 10 in such a manner to simultaneously control the intensity of both electron beams according to the applied voltage and thus simultaneously controlling the amount of current flow in the output circuitry associated with anodes 13, 14, 19 and 20 respectively.

In operation, the transverse deflection-field established between deflection plates 15 and 16 is normally adjusted to direct the electron beam in the right-hand section of the tube along an axis 3—3, as shown in Figure 1, to be intercepted by anodes 13 and 14 in equal proportions. Thus equal currents flow through the output circuits associated with anodes 13 and 14. Therefore, when an input voltage of positive polarity is applied to deflection plate 15, or alternatively when an input voltage of negative polarity is applied to deflection plate 16, the beam is deflected toward anode 13 such that, now, more current flows in the output circuit associated with plate 13 than in the output circuit associated with anode 14. Conversely, when a positive input voltage is applied to deflection plate 16, or alternatively, when negative input voltage is applied to deflection plate 15, the electron beam is deflected toward anode 14, thus permitting more current to flow through the output circuit associated with anode 14 and less current to flow through the ouput circuit associated with anode 13.

The second electron beam, projected from the opposite electron-emissive surface of cathode 10, is projected along an axis 3—3 toward anodes 19 and 20. Anodes 19 and 20 are disposed on opposite sides of the electron beam in such a manner that equal portions of their active or electron-receptive areas are exposed to the electron beam, thus permitting equal currents to flow through the output circuit associated with each anode.

In Figures 1 and 2, only the essential elements of the electrode system are illustrated. Refinements of this system may be added in accordance with well known practices in the art. Thus, for example, the accelerating electrodes 12 and 18 may be omitted and moreover it may be advantageous to include one or more suppressor electrodes between anodes 13 and 14 and deflectors 15 and 16. It may also be advantageous not to mount the electron receptive surfaces of the electrodes 13, 14, 19 and 20 perpendicular to the axes of the respective electron beams but instead to incline the anode surfaces while keeping the projected areas thereof in proper proportion relative to the respective electron beams. The particular form of deflection control means employed is not essential to the present invention; one or both of the deflection plates 15 and 16 may be replaced by several electrodes biased at different potentials, which may correspond, for example, to cathode potential and the D.-C. supply voltage of the associated apparatus with which the tube is employed, or a magnetic-deflection system may be employed. Moreover, entirely equivalent operation may be obtained by employing separate electron beams projected along different axes and having the intensities thereof varied by separate grid structures.

The electrode system is mounted within a suitable envelope, not shown, which then may be evacuated, gettered and based in accordance with well-known procedures in the art. The entire structure may conveniently be included within a miniature tube envelope.

Figure 4:
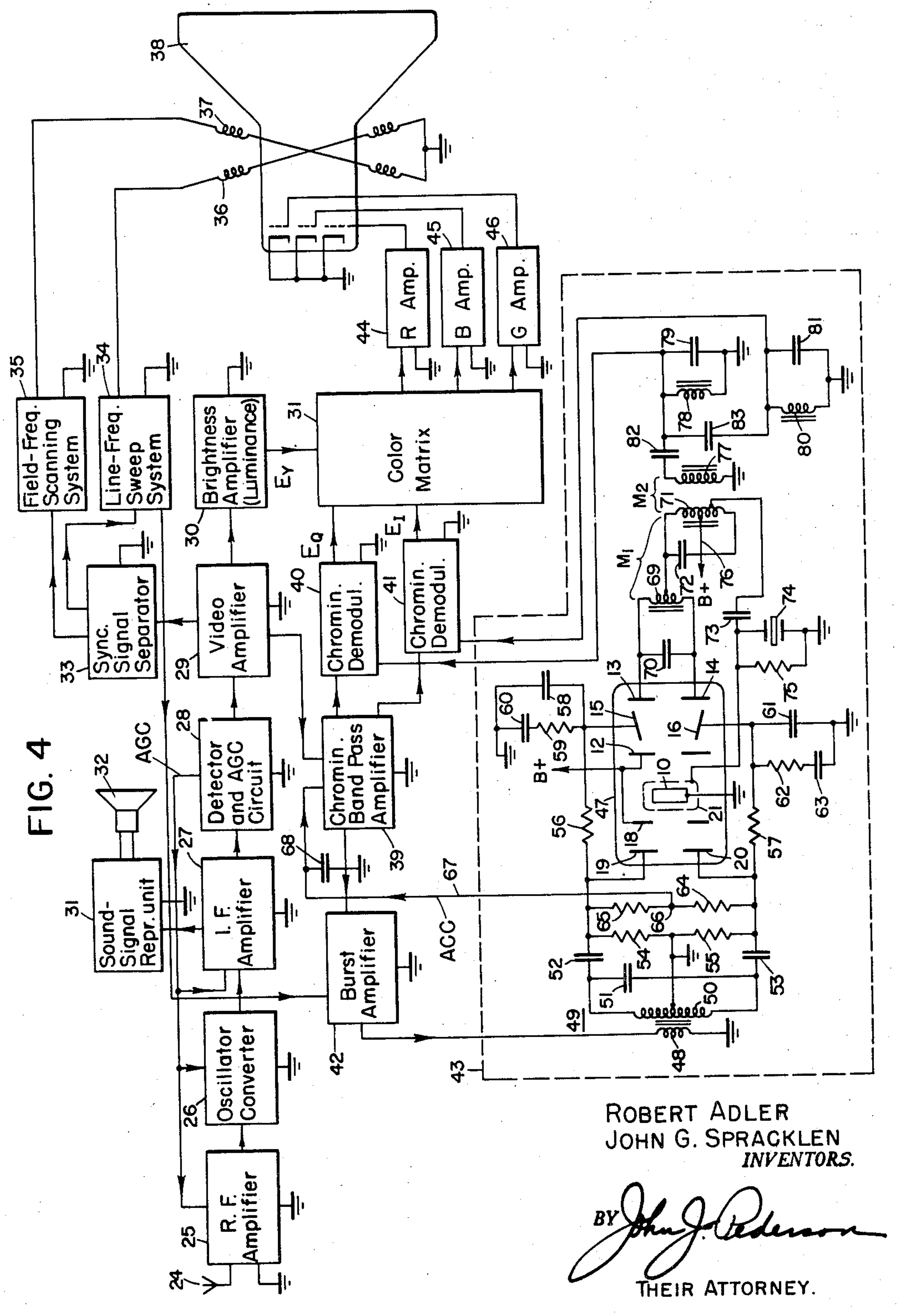
Figure 4 is a schematic diagram of a television receiver embodying the present invention.

In accordance with the present invention, a beam deflection tube of the type shown and described in connection with Figures 1 and 2 may be employed in a color-television receiver in the manner schematically illustrated in Figure 4.

Incoming composite color signals are intercepted by an antenna 24 and translated by conventional receiving circuits, including a radio-frequency amplifier 25, an oscillator-converter 26 and an intermediate-frequency amplifier 27, to a video detector and AGC circuit 28. The modulation components are derived from the composite color signal in video detector 28 and are supplied to a video amplifier 29. The video amplifier 29, in turn, supplies the derived monochrome component to a brightness or luminance amplifier 30, to be amplified to a value suitable for application to a color matrixing circuit 31.

The output circuit of the AGC supply, included in the unit 28, is connected to the input circuits of one or more of the receiver stages comprising radio-frequency amplifier 25, oscillator-converter 26, and intermediate-frequency amplifier 27 in a well-known manner. A sound-signal reproducing unit 31 is also connected to the output circuit of the intermediate-frequency amplifier 27 and may include one or more stages of intermediate-frequency amplification, a sound-signal detector, one or more stages of audio frequency amplification and a sound-reproducing device such as a speaker 32.

Horizontal and vertical synchronizing-signal components of the received composite color signal from video amplifier 29 are separated therefrom in a synchronizing-signal separator 33 and are utilized to synchronize the operation of the line-frequency sweep and field-frequency scanning systems 34 and 35, respectively. These generators supply signals of substantially sawtooth waveform which are properly phased with reference to the transmitted composite color-picture signal and which are applied to the horizontal and vertical deflection windings 36 and 37, respectively, of a color reproducing unit, such as a tricolor picture tube 38 or the like, to cause the cathode-ray beams therein to scan the image screen in synchronism with the scanning operation at the transmitter.

The composite color signal from video amplifier 29 is supplied to a chrominance band-pass amplifier 39 wherein the chrominance information, or color picture signal, is extracted from the composite color signal and applied to a pair of synchronous demodulators 40 and 41. Composite color signal from the chroma amplifier 39 is supplied to a burst amplifier 42 which functions to remove the color bust signal from the composite color signal, the color bust being that portion of the composite color signal comprising a few cycles of a sine wave of chrominance subcarrier frequency which is used to establish a phase reference for demodulating the chrominance signal.

In order to achieve color burst separation, burst amplifier 42 is rendered conductive only during horizontal blanking time. The burst amplifier 42 is normally biased beyond cut-off and horizontal retrace pulses obtained from line-frequency sweep system 34 are employed to key on burst amplifier 42 only during presence of the burst voltage. The burst signal is then supplied to the input terminal of a chrominance synchronization system, indicated generally by reference numeral 43, which develops a pair of quadrature-phased color-reference signals synchronized in frequency and phase with the burst signal as received from the transmitter station. The two quadrature-phased color-reference voltages derived by the chrominance synchronization system 43 are simultaneously supplied to the input terminals of chrominance demodulators 40 and 41 wherein the color picture information is separated into $E_I$ and $E_Q$ chrominance signal voltages, all in a well known manner, for application to color matrixing unit 31.

The $E_I$ and $E_Q$ voltages and the brightness or luminance voltage $E_Y$ from luminance amplifier 30 are combined in appropriate proportions within color matrixing unit 31 to produce the three required color signals, R, B, and G. Color signals R, B, and G are further amplified by amplifiers 44, 45, and 46 and applied to the respective control grids of color picture tube 30.

Figure 3:
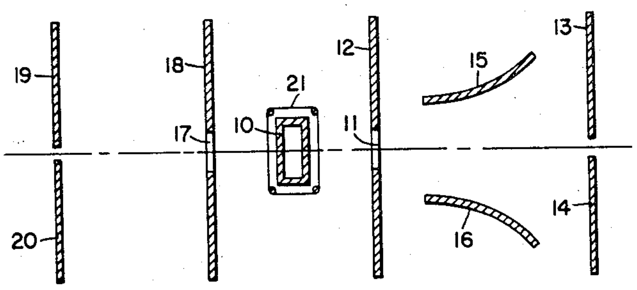
Figure 3 is a cross-sectional view of the electrode system as viewed along the line 3—3 of Figure 1.

With the exception of the chrominance synchronization system 43, the construction and operation of the receiver of Figure 3 are entirely conventional and therefore need not be further described in detail. The invention is not restricted to application in a receiver of the type shown in Figure 3 but it may be utilized to advantage in any system wherein it is desired to derive, from an incoming control signal, output voltages having a substantially fixed frequency and phase relation with respect to the incoming control signal.

Chrominance synchronization system 43 utilized a beam deflection tube 47 of the type described in connection with Figures 1 and 2. The left-hand section of tube 47 is employed as a balanced phase detector, while the right-hand section is employed as a color-reference oscillator controlled by the phase detector comprising the left-hand section. Burst amplifier 42 is coupled to the upper terminal of the primary winding 48 of transformer 49, and the lower terminal of winding 48 is returned to a reference or ground potential. The secondary winding 50 of transformer 49 is tuned to resonate at the color-burst frequency by means of a tuning condenser 51 connected thereacross and has a center tap returned to ground potential. The opposite terminals of secondary winding 50 are coupled through coupling condensers 52 and 53 to plates 19 and 20 respectively of beam deflection tube 47. A pair of load resistors 54 and 55, of substantially equal resistance, are connected to plates 19 and 20, respectively, and returned to ground potential.

Anodes 19 and 20 are coupled to electrostatic deflection plates 15 and 16 through respective resistors 56 and 57. An integrating network comprising resistor 56 and condenser 60, and an anticipatory network comprising resistor 59 and condenser 58 are connected between anode 19, deflection plate 15 and ground. Similarly, another integrating network comprising resistor 57 and condenser 63 and a second anticipatory network comprising resistor 62 and condenser 61 are connected bebetween anode 20, deflection plate 16 and ground.

To provide automatic chroma control for chrominance amplifier 39, a pair of substantially equal series-connected resistors 64 and 65 connected between anodes 19 and 20. The junction 66 of resistors 64 and 65 is connected to chroma-amplifier 39 through a lead 67 bypassed to ground potential by means of a bypass condenser 68.

The right-hand section of tube 47 is connected in a local oscillator circuit for generating the required color-reference signal. A center tapped and balanced coil 69, tuned to resonate at the color-burst frequency by means of a parallel-connected tuned condenser 70, is connected between anodes 13 and 14. A second coil 71, less-than-critically inductively coupled to coil 69 as indicated by the symbol $M_1$, is tuned to resonate at the color-burst frequency by a parallel-connected tuning condenser 72. The upper terminal of coil 71 is connected to the center tap of coil 69 and a coupling condenser 73 is connected between grid 21 and a tap on coil 71. A stabilizing piezo-electric crystal 74, having an anti-resonant frequency substantially equal to the color-burst frequency, and a grid-leak resistor 75 are each connected to grid 21 and returned to ground potential. An additional tap on coil 71, located between the first-mentioned tap on this coil and its upper end, is connected through a lead 76 to a suitable positive unidirectional operating potential source, conventionally designated B+.

In order to produce the desired quadrature-phased color-reference voltage necessary for proper operation of the two chrominance demodulators 40 and 41, a third coil 77 is inductively coupled to oscillator tank coil 71 as represented by symbol $M_2$. The lower terminal of coil 77 is returned to ground potential, while the upper terminal is coupled to a phase shifting network comprising coupling condenser 82, coil 78 paralleled by tuning condenser 79, coupling condenser 83 and coil 80 paralleled by tuning condenser 81. The lower terminals of coils 78 and 80 are returned to ground potential, and the upper terminals are respectively coupled to demodulators 40 and 41.

In operation, the combined currents from anodes 13 and 14 flow through the upper part of oscillator tank coil 71 and induce a voltage in the lower part of the same coil 71 which is applied to grid 21 through coupling condenser 73. Oscillation at the frequency of tuned circuit 71 and 72 is thus sustained in a well-known manner with the two anodes 13 and 14 together functioning as a single anode. The frequency of this oscillation is stabilized by crystal 74.

As long as the electron beam emitted from cathode 10 is intercepted equally by anodes 13 and 14, the current flowing from anode 13 through the upper half of coil 69 is equal and opposite to the current flowing from anode 14 through the lower half thereof; thus the net alternating current flowing between the terminals of coil 69 is zero and there is no voltage induced in oscillator coil 71 by mutual coupling from coil 69. However, if the electron beam should deviate from this neutral position, due to a net unidirectional potential difference appearing between deflection plates 15 and 16, a resultant alternating current will flow across the tuned circuit formed by coil 69 and condenser 70. As coils 69 and 71 are inductively coupled, an additional quadrature-phased voltage is induced in coil 71 having a relative amplitude proportional to the amount of deviation of the electron beam from its neutral position and having a positive or negative quadrature phase depending upon whether the electron beam has been deflected toward anode 13 or toward anode 14. The phase of the oscillator voltage appearing on grid 21 is therefore dependent upon the vector sum of the voltage produced in coil 71 due to the combined alternating current from anodes 13 and 14 and the quadrature-phased voltage induced in coil 71 by mutual coupling due to the unbalanced current flowing through tuned circuit 69—70.

Since the combined space current directed to anodes 13 and 14 flows through the upper section of coil 71, a constant-amplitude regenerative voltage is produced for application to grid 21 regardless of how much the electron beam may have been deflected.

Figure 5A:
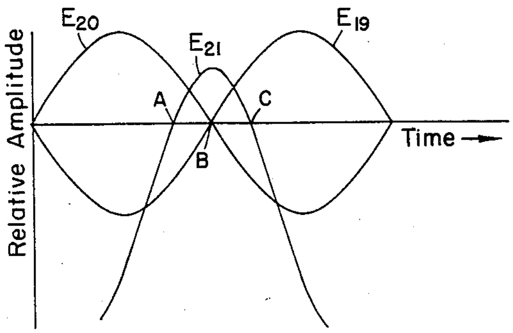
Figures 5A, 5B and 5C are graphical representations explaining the operation of the invention.

As secondary 50 of transformer 49 includes a grounded center tap, the color-burst reference voltage from burst amplifier 42 is applied in opposite phase, or in push-pull, to anodes 19 and 20. With reference to Figure 5*a* of the drawing, voltage $E_{20}$ appearing at anode 20 is substantially 180 degrees out of phase with voltage $E_{19}$ appearing at anode 19. With the electron beam from cathode 10 in a neutral position with respect to anodes 13 and 14, the phase of the oscillator voltage $E_{21}$, appearing on grid 21, is substantially in quadrature with respect to voltages $E_{19}$ and $E_{20}$, and because of the self-biasing action of condenser 73 and resistor 75, the grid voltage $E_{21}$ becomes positive during only a very small portion of each cycle. As the oscillator grid 21 also controls the intensity of the electron stream in the left-hand portion of tube 47, anode 20 is rendered conductive during positive portions of the oscillator voltage $E_{21}$ on control grid 21 as long as anode voltage $E_{20}$ is positive, interval A—B. For the same reason, anode 19 is rendered conductive during positive portions of the oscillator voltage $E_{21}$ on control grid 21 as long as anode voltage $E_{19}$ is positive, interval B—C. Therefore, as long as oscillator voltage $E_{21}$ is in substantial phase quadrature with respect to anode voltages $E_{19}$ and $E_{20}$, equal currents flow from anodes 19 and 20 in opposite directions to ground through each half of secondary winding 50 of transformer 49. However, if the phase of oscillator voltage $E_{21}$ is retarded, as shown in Figure 5*c*, anode 20 is rendered conductive for a longer period of time and at greater intensity than anode 19 and conversely if the phase of oscillator voltage $E_{21}$ is advanced, as shown in Figure 5*b*, anode 19 is rendered conductive for a longer period of time and at greater intensity than anode 20.

Therefore, a push-pull or balanced unidirectional control voltage is developed across load resistors 54 and 55 with respect to ground potential and, consequently, across anodes 19 and 20. The unidirectional control potentials appearing on anodes 19 and 20 are equal in magnitude as long as the oscillator voltage $E_{21}$ appearing on control grid 21 is in substantial phase quadrature with the color-burst reference voltages $E_{19}$ and $E_{20}$ appearing on anodes 19 and 20. If the phase of the oscillator voltage as appearing on control grid 21 deviates to one side of the quadrature relation with respect to the color-burst voltage, the control voltage appearing at anode 19 increases in amplitude with respect to the control voltage appearing at anode 19 increases in amplitude with respect to the control voltage appearing at anode 20. Conversely, if the phase of the oscillator voltage appearing on control grid 21 deviates to the other side of the quadrature relation, the control voltage appearing at anode 19 decreases in magnitude as compared with the control voltage appearing at grid 21.

The unidirectional control voltages appearing on anodes 19 and 20 also produce equal control potentials on deflection plates 15 and 16 as long as the oscillator voltage $E_{21}$ is in quadrature with voltages $E_{19}$ and $E_{20}$.

Figure 5B:
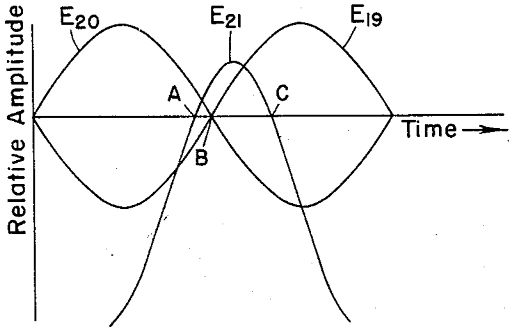
Figure 5C:
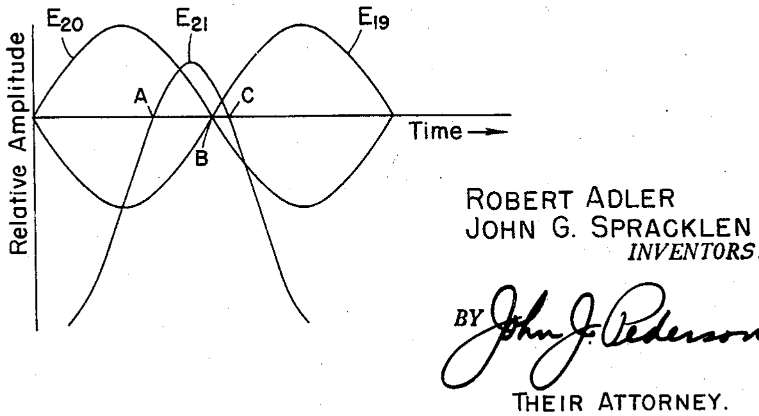

Suppose the phase of the oscillator voltage $E_{21}$ appearing on control grid 21, due to some extraneous reason, changes so as to lag the phase of anode voltage $E_{20}$ by an angle greater than 90 degrees, as shown in Figure 5*b*. The negative unidirectional control voltage developed at anode 19 then becomes greater than the negative control voltage developed at anode 20. Therefore, a potential difference arises between deflection plates 15 and 16 of such polarity that the electron beam in the right-hand section is deflected from its normal position toward anode 14, thus increasing the current flowing therethrough and simultaneously decreasing the current flowing through anode 13. A net unbalance current then flows through tuned circuit 69—70 which, in turn, induces a quadrature-phased voltage into coil 71 proportional to the amount of phase error. The quadrature-phased voltage induced in coil 71, detunes coil 71, by a proportional amount and thus the free running frequency of the oscillator is altered to restore the equilibrium condition of substantial phase quadrature with respect to the phase of the color-burst reference voltages appearing on anodes 19 and 20.

A phase error in a direction opposite to that previously assumed is corrected in a fully analogous manner. Therefore, the chrominance synchronization circuit 43 produces across coil 71 a color-reference voltage having a frequency equal to and at a predetermined fixed phase with respect to that of the color-burst reference voltage from burst amplifier 42.

Due to the balanced characteristics of the chrominance synchronization circuit 43, highly desirable and substantial random noise immunity is realized. As anodes 19 and 20 are rendered conductive each time control grid 21 swings positive, extraneous noise voltages appearing at the input circuit are applied in opposite phase to anodes 19 and 20 and are rectified so as to produce equal changes in the average or integrated deflection voltages applied to deflection plates 15 and 16. Therefore, the electron beam directed toward anodes 13 and 14 is little affected by noise in the received color bursts and the same holds for the frequency and phase of the oscillator.

The unidirectional voltage appearing at junction 66 depends upon the combined current flow through resistors 54 and 55 from anodes 19 and 20, integrated by condenser 68 in cooperation with divider resistor 64 and 65. As was previously explained, the oscillator voltage $E_{21}$ appearing on grid 21 is not affected by the appearance of an unbalanced control voltage across anodes 19 and 20. While an asymmetrical phase relationship between oscillator voltage $E_{21}$ on one hand and anode voltages $E_{19}$ and $E_{20}$ on the other hand leads to an unbalance between the currents to anodes 19 and 20 as previously explained, the increase of one of these currents is substantially equal to the decrease of the other, so that their sum is little affected by a phase error. These currents are, however, approximately proportional to the color-burst voltage across coil 50, and therefore the unidirectional voltage appearing at junction 66 may be utilized to vary the gain of chroma amplifier 39 so as to provide automatic chroma control.

Voltages appearing on tuned circuits 78—79 and 80—81 are adjusted to provide the amplitude and phase required by the two demodulators 40 and 41. These adjustments may be carried out in a well known manner and a detailed description is therefore considered unnecessary.

Thus the present invention provides a new and improved phase controllable oscillating system, and more particularly, as a preferred embodiment, a novel burst synchronizing-control system for a color television receiver or the like which combines several functions hitherto performed by separate receiver stages into a simple, compact, and inexpensive circuit comprising a relatively small number of elements and in addition provides a system with inherent random noise immunity.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A color television receiver for utilizing a composite color signal having chrominance signal and color-synchronizing-burst signal components comprising: an electron-discharge system comprising means including a cathode for projecting an electron beam along a reference axis, means for controlling the intensity of said beam, a pair of output electrodes having electron-receptive areas on opposite sides of said reference axis, and deflection-control means for controlling the distribution between said output electrodes of space current from said electron beam; oscillator means including at least a portion of said electron-discharge system and a frequency-determining circuit coupled to at least one of said output electrodes for generating a color-reference signal of nominal frequency equal to that of said color-synchronizing-burst signal; a phase detector coupled to said oscillator means and responsive to application of said color-synchronizing-burst signal for developing a unidirectional control voltage indicative of the instantaneous phase relation between said color-synchronizing-burst signal and said color-reference signal; means for applying said unidirectional control voltage to said deflection-control means to vary the space-current distribution between said output electrodes in accordance with departures from said predetermined nominal phase relation; means coupled to said output electrodes and to said frequency-determining circuit and responsive to variations in said space-current distribution for effectively varying the frequency of said frequency-determining circuit in a direction tending to restore said predetermined phase relation; and color demodulator means coupled to said oscillator means for utilizing said color-reference signal to detect said chrominance signal components.

2. A color television receiver for utilizing a composite color signal having chrominance signal and color-synchronizing-burst signal components comprising: a first electron-discharge system comprising means including a cathode for projecting an electron beam along a reference axis, means for controlling the intensity of said beam, a pair of output electrodes having electron-receptive areas on opposite sides of said reference axis, and deflection-control means for controlling the distribution between said output electrodes of space current from said electron beam; a second electron-discharge system comprising a cathode, an intensity-control electrode, and a pair of balanced anodes; oscillator means including at least a portion of said first electron-discharge system and a frequency-determining circuit coupled in like phase to said output electrodes for generating a color-reference signal of nominal frequency equal to that of said color-synchronizing-burst signal; a balanced phase detector including said second electron-discharge system, means for applying said color-synchronizing-burst signal in opposite phase to said balanced anodes, means for applying said color-reference signal to said intensity-control electrode, and a balanced output circuit coupled to said anodes for developing a balanced unidirectional control voltage indicative of the instantaneous phase relation between said color-synchronizing-burst signal and said color-reference signal; means for applying said unidirectional control voltage to said deflection-control means to vary the space current distribution between said output electrodes in accordance with departures from said predetermined nominal phase relation; means coupled to said output electrodes and to said frequency-determined circuit and responsive to variations in said space current distribution for effectively varying the frequency of said frequency-determining circuit in a direction tending to restore said predetermined phase relation; and color demodulator means coupled to said oscillator means for utilizing said color-reference signal to detect said chrominance signal components.

3. A color television receiver for utilizing a composite color signal having chrominance signal and color-synchronizing-burst signal components comprising: an electron-discharge system comprising means including a cathode for projecting an electron beam along a reference axis, means including a control grid for controlling the intensity of said beam, a pair of balanced output electrodes having electron-receptive areas on opposite sides of said reference axis, and electrostatic deflection-control means for controlling the distribution between said output electrodes of space current from said electron beam; oscillator means including at least a portion of said electron-discharge system and a frequency-determining circuit coupled to at least one of said output electrodes for generating a color-reference signal of nominal frequency equal to that of said color-synchronizing-burst signal; a phase detector coupled to said oscillator means and responsive to application of said color-synchronizing-burst signal for developing a unidirectional control voltage indicative of the instantaneous phase relation between said color-synchronizing-burst signal and said color reference signal; means for applying said unidirectional control voltage to said electrostatic deflection-control means to vary the space current distribution between said output electrodes in accordance with departures from said predetermined nominal phase relation; means coupled to said output electrodes and to said frequency-determining circuit and responsive to variations in said space current distribution for effectively varying the frequency of said frequency-determining circuit in a direction tending to restore said predetermined phase relation; and color demodulator means coupled to said oscillator means for utilizing said color-reference signal to detect said chrominance signal components.

4. A color television receiver for utilizing a composite color signal having chrominance signal and color-synchronizing-burst signal components comprising: an electron-discharge system comprising means including a cathode having a pair of oppositely disposed electron-emissive surfaces for projecting oppositely directed electron beams along respective reference axes, means for simultaneously controlling the intensity of said beams, a pair of output electrodes having electron-receptive areas on opposite sides of one of said reference axes, deflection-control means for controlling the distribution between said output electrodes of space current from said cathode, and a pair of balanced output anodes having electron-receptive areas on opposite sides of the other of said reference axes for receiving space current from said cathode; oscillator means including a frequency-determining circuit coupled to at least one of said output electrodes for generating a color-reference signal of nominal frequency equal to that of said color-synchronizing-burst signal; a balanced phase detector including means for applying said color-synchronizing-burst signal in opposite phase to said anodes, means for applying said color-reference signal to said intensity-control electrode, and a balanced output circuit coupled between said anodes for developing a balanced unidirectional voltage indicative of the instantaneous phase relation between said color-synchronizing-burst signal and said color-reference signal; means for applying said unidirectional control voltage to said deflector-control means to vary the space current distribution between said output electrodes in accordance with departures from said predetermined nominal phase relation; means coupled to said output electrodes and to said frequency-determining circuit and responsive to variations in said space current distribution for effectively varying the frequency of said frequency-determining circuit in a direction tending to restore said predetermined phase relation; and color demodulator means coupled to said oscillator means for utilizing said color-reference signal to detect said chrominance signal components.

5. A color television receiver for utilizing a composite color signal having chrominance signal and color-synchronizing-burst components comprising: an electron-discharge system comprising means including a cathode having a pair of oppositely disposed electron-emissive surfaces for projecting oppositely disposed electron beams along respective reference axes, a control grid surrounding said cathode for simultaneously controlling the intensity of said beams, a pair of balanced output electrodes having electron-receptive areas on opposite sides of one of said reference axes, a pair of deflection-control electrodes for controlling the distribution between said output electrodes of space current from said cathode, and a pair of balanced output anodes having electron-receptive areas on opposite sides of the other of said reference axes for receiving space current from said cathode; oscillator means including a frequency-determining circuit coupled in like phase to said output electrodes for generating a color-reference signal of nominal frequency equal to that of said color-synchronizing-burst signal; a balanced phase detector comprising means for applying said color-synchronizing-burst signal in opposite phase to said balanced anodes, means for applying said color-reference signal to said control grid, and a balanced output circuit coupled between said anodes for developing a balanced unidirectional control voltage indicative of the instantaneous phase relation between said color-synchronizing-burst signal and said color-reference signal; means for applying said unidirectional control voltage between said deflection-control electrodes to vary the space current distribution between said output electrodes in accordance with departures from said predetermined nominal phase relation; means coupled to said output electrodes and to said frequency-determining circuit and responsive to variations in said space current distribution for effectively varying the frequency of said frequency-determining circuit in a direction tending to restore said predetermined phase relation; and color demodulator means coupled to said oscillator means for utilizing said color-reference signal to detect said chrominance signal components.

6. A color television receiver for utilizing a composite color signal having chrominance signal and color-synchronizing-burst signal components comprising: an electron-discharge system comprising means including a cathode for projecting an electron beam along a reference axis, means for controlling the intensity of said beam, a pair of balanced output electrodes having electron-receptive areas on opposite sides of said reference axis, and deflection-control means for controlling the distribution between said output electrodes of space current from said electron beam; oscillator means including a resonant frequency-determining circuit coupled to said intensity-control means and a balanced tuned circuit connected between said output electrodes and provided with a center tap connected to one terminal of said frequency-determining circuit to couple said output electrodes in like phase to said frequency-determining circuit for generating a color-reference signal of nominal frequency equal to that of said color-synchronizing-burst signal; a phase detector coupled to said oscillator means and responsive to application of said color-synchronizing-burst signal for developing a unidirectional control voltage indicative of the instantaneous phase relation between said color-synchronizing-burst signal and said color-reference signal; means for applying said unidirectional control voltage to said deflection-control means to vary the space current distribution between said output electrodes in accordance with departures from said predetermined nominal phase relation; means coupled to said output electrodes and to said frequency-determining circuit and responsive to variations in said space current distribution for effectively varying the frequency of said frequency-determining circuit in a direction tending to restore said predetermined phase relation; and color demodulator means coupled to said oscillator means for utilizing said color-reference signal to detect said chrominance signal components.

7. A color television receiver for utilizing a composite color signal having chrominance signal and color-synchronizing-burst signal components comprising: an electron-discharge system comprising means including a cathode for projecting an electron beam along a reference axis, means for controlling the intensity of said beam, a pair of balanced output electrodes having electron receptive areas on opposite sides of said reference axis, and deflection-control means for controlling the distribution between said output electrodes of space current from said electron beam; oscillator means including at least a portion of said electron-discharge system and a frequency-determining circuit, coupled in like phase to said output electrodes for generating a color-reference signal of nominal frequency equal to that of said color-synchronizing-burst signal; a phase detector coupled to said oscillator means and responsive to application of said color-synchronizing-burst signal for developing a unidirectional control voltage indicative of the instantaneous phase relation between said color-synchronizing-burst signal and said color reference signal; means for applying said unidirectional control voltage to said deflection-control means to vary the space current distribution between said output electrodes in accordance with departures from said predetermined nominal phase relation; a tuned circuit connected in push-pull between said output electrodes and less-than-critically inductively coupled to said frequency-determining circuit for injecting into said frequency-determining circuit a reactive voltage component having an amplitude and polarity indicative of variations in said space current distribution to vary the frequency of said oscillator means in a direction tending to restore said predetermined phase relation; and color demodulator means coupled to said oscillator means for utilizing said color-reference signal to detect said chrominance signal components.

8. A color television receiver for utilizing a composite color signal having chrominance signal and color-synchronizing-burst signal components comprising: an electron-discharge system comprising means including a cathode for projecting an electron beam along a reference axis, means for controlling the intensity of said beam, a pair of output electrodes having electron receptive areas on opposite sides of said reference axis, and deflection-control means for controlling the distribution between said output electrodes of space current from said electron beam; oscillator means including at least a portion of said electron-discharge system and a frequency-determining circuit coupled to at least one of said output electrodes for generating a color-reference signal of nominal frequency equal to that of said color-synchronizing-burst signal; a phase detector coupled to said oscillator means and responsive to application of said color-synchronizing-burst signal for developing a unidirectional control voltage indicative of the instantaneous phase relation between said color-synchronizing-burst signal and said color reference signal; means for applying said unidirectional control voltage to said deflection-control means to vary the space current distribution between said output electrodes in accordance with departures from said predetermined nominal phase relation; means coupled to said output electrodes and to said frequency-determining circuit and responsive to variations in said space current distribution for effectively varying the frequency of said frequency-determining circuit in a direction tending to restore said predetermined phase relation; means including a pair of tuned circuits individually less-than-critically inductively coupled to said frequency-determining circuit for deriving a pair of substantially quadrature-phased color-reference signals of nominal frequency equal to that of said color-synchronizing-burst signal and each in a predetermined nominal phase relation therewith; and color demodulator means coupled to said oscillator means for utilizing said color-reference signals to detect said chrominance signal components.

9. A color television receiver for utilizing a composite color signal having chrominance signal and color-synchronizing-burst signal components comprising: a first electron-discharge system comprising means including a cathode for projecting an electron beam along a reference axis, means for controlling the intensity of said beam, a pair of output electrodes having electron-receptive areas on opposite sides of said reference axis, and deflection-control means for controlling the distribution between said output electrodes of space current from said electron beam; a second electron-discharge system comprising a cathode, an intensity-control electrode, and a pair of balanced anodes; oscillator means including at least a portion of said first electron-discharge system and a frequency-determining circuit coupled to at least one of said output electrodes for generating a color-reference signal of nominal frequency equal to that of said color-synchronizing-burst signal; a balanced phase detector including said second electron-discharge system, means for applying said color-synchronizing-burst signal in opposite phase to said balanced anodes, means for applying said color-reference signal to said intensity-control electrode, and a balanced output circuit coupled to said anodes for developing a balanced unidirectional control voltage indicative of the instantaneous phase relation between said color-synchronizing-burst signal and said color-reference signal; means coupled to said balanced output circuit for developing an additional unidirectional control voltage indicative of the instantaneous amplitude of said color-synchronizing-burst signal; means for applying said balanced unidirectional control voltage to said deflection-control means to vary the space current distribution between said output electrodes in accordance with departures from said predetermined nominal phase relation; means coupled to said output electrodes and to said frequency-determining circuit and responsive to variations in said space current distribution for effectively varying the frequency of said frequency-determining circuit in a direction tending to restore said predetermined phase relation; color demodulator means coupled to said oscillator means for utilizing said color-reference signal to detect said chrominance signal components; and means for utilizing said additional control voltage to effect automatic chroma control of said receiver.

10. A color television receiver for utilizing a composite color signal having chrominance signal and color-synchronizing-burst signal components comprising: an electron-discharge system comprising means including a cathode having oppositely disposed electron-emissive surfaces for projecting oppositely directed electron beams centered about respective reference axes, an intensity-control grid encompassing said cathode for simultaneously controlling the intensity of said beams, a pair of balanced output electrodes having electron-receptive areas on opposite sides of one of said reference axes, electrostatic deflection-control means for controlling the distribution between said output electrodes of space current from said cathode, and a pair of balanced output anodes having electron-receptive areas on opposite sides of the other of said electron beam for receiving space current from said cathode; crystal-controlled oscillator means including a resonant frequency-determining circuit and a crystal coupled to said intensity-control grid and a balanced tuned circuit connected between said output electrodes and provided with a center tap connected to one terminal of said frequency-determining circuit to couple said output electrodes in like phase to said frequency-determining circuit for generating a color-reference signal of nominal frequency equal to that of said color synchronizing burst signal; a balanced phase detector including a portion of said electron-discharge system, means for applying said color-synchronizing-burst signal in opposite phase to said balanced anodes, means for applying said color-reference signal to said intensity-control grid, a balanced output circuit coupled between said balanced anodes for developing a balanced unidirectional control voltage indicative of the instantaneous phase relation between said color-synchronizing-burst signal and said color-reference signal, and additional output circuit means coupled to said balanced output circuit for developing an additional unidirectional control potential indicative of the instantaneous amplitude of said color-synchronizing-burst signal; means coupled to said additional output circuit means for utilizing said additional control potential to effect automatic chroma control of said receiver; means for applying said balanced unidirectional control voltage to said deflection-control means to vary the space current distribution between said output electrodes in accordance with departures from said predetermined nominal phase relation; a tuned circuit connected in push-pull between said output electrodes and less-than-critically inductively coupled to said frequency-determining circuit for injecting into said frequency-determining circuit a reactive voltage component having an amplitude and polarity indicative of variations in said space current distribution to vary the frequency of said oscillator means in a direction tending to restore said predetermined phase relation; means including a pair of tuned circuits individually less-than-critically inductively coupled to said frequency-determining circuit for deriving a pair of substantially quadrature-phased color-reference signals of nominal frequency equal to that of said color-synchronizing-burst signal and each in a predetermined nominal phase relation therewith; and color demodulator means coupled to said tuned circuit means for utilizing said color-reference signals to detect said chrominance signal components.

References Cited in the file of this patent

UNITED STATES PATENTS

| | | |
|---|---|---|
| 2,684,404 | Adler | July 20, 1954 |
| 2,718,553 | Adler | Sept. 20, 1955 |
| 2,721,895 | Spracklen | Oct. 25, 1955 |